United States Patent Office 3,546,156
Patented Dec. 8, 1970

3,546,156
ORGANOSILICON RESINS CONTAINING VINYL GROUPS
Jean Baronnier and Jean Boissieras, Lyon, France, assignors to Rhone-Poulenc, Paris, France, a French body corporate
No Drawing. Filed Nov. 20, 1968, Ser. No. 777,457
Claims priority, application France, Nov. 21, 1967, 129,062
Int. Cl. C08g *51/04*
U.S. Cl. 260—37          6 Claims

ABSTRACT OF THE DISCLOSURE

The invention provides novel, liquid, storage-stable organosilicon resins consisting of units of formulae: $C_6H_5SiO_{1.5}$, $(CH_3)_3SiO_{0.5}$, $(C_6H_5)_2SiO$, $$(CH_3)(CH_2{:}CH)SiO$$

and $(CH_3)_2SiO$ in specified proportions which are curable with organic peroxides.

---

This invention relates to organosilicon resins containing vinyl groups.

It is advantageous to have available organosilicon resins which may be employed without the use of a solvent, and organosilicon resins containing vinyl groups attached to the silicon atoms because such groups can be cross-linked at elevated temperature and the properties of the resin improved for certain applications. Liquid resins containing vinyl groups may be linear type, such as those of French Pat. No. 1,166,405, or cross-linked, such as those of French Pat. No. 1,059,884. However, the cross-linked resins which are known at present, and which are obtained by condensation of silanols made by hydrolysis of halogenosilanes, are only liquid if they are incompletely condensed. Consequently, on the one hand, the resins are not storage stable and progressively become so condensed as not to be usable as such, and, on the other hand, water is liberated during the conversion of such resins into shaped articles. Also previously known organosilicon resins containing vinyl groups, whether linear or cross-linked, are still unsatisfactory for certain applications which require products having excellent properties as electrical insulators and capable of withstanding considerable mechanical stresses, sometimes at high temperatures.

New organopolysiloxane resins have now been found which can be employed without solvent, are stable on storage, and from which can be produced articles possessing both good mechanical and good electrical properties, which are retained at high temperature. These resins consist of units of the formulae:

$$C_6H_5SiO_{1.5}, (CH_3)_3SiO_{0.5}, (C_6H_5)_2SiO$$

$$(CH_3)(CH_2{:}CH)SiO \text{ and } (CH_3)_2SiO$$

contain on average, for each silicon atom:

0.38 to 0.44 vinyl group
0.75 to 0.96 phenyl group, and
1.94 to 1.99 in total phenyl, vinyl and methyl groups; and contain on average, for each ten $C_6H_5SiO_{1.5}$ units:
  5 to 9 $(CH_3)_3SiO_{0.5}$ units,
  25 to 50 $(C_6H_5)_2SiO$ units,
  30 to 50 $(CH_3)(CH_2{=}CH)SiO$ units, and
  2 to 12 $(CH_3)_2SiO$ units.

The resins of the invention are obtained by cohydrolysis and cocondensation of phenyltrichlorosilane, trimethylchlorosilane, diphenyldichlorosilane, methylvinyldichlorosilane and dimethyldichlorosilane, in mole proportions corresponding to the proportions specified above for the corresponding units. This operation may be carried out in manner known per se. For example, the mixture of organochlorosilanes may be dissolved in an appropriate diluent, such as diethyl ether, toluene, xylene, cyclohexane or methyl cyclohexane, the mixture may be stirred and water of hydrolysis may be added. Conversely, it is also possible to add the organic organochlorosilane solution to appropriately stirred water. The hydrolysis temperature is not critical and may vary within wide limits; thus, if a diluent of low boiling point, such as diethyl ether, is employed, simple reflux of the reaction mixture is sufficient for effective control of the reaction.

The quantity of diluent employed must be sufficient to dissolve the organochlorosilanes and their cocondensates. The quantity of water may be a very large excess over that required by the number of Si-Cl groups to be hydrolysed. Generally, when all the organochlorosilanes have been brought into contact with the water of hydrolysis, the stirring of the mixture continues for some time, whereafter the acid waters are eliminated, and the solution of organosilicon cocondensates is washed with water to neutrality.

These cocondensates in solution are composed of polymers of low molecular weight containing Si—O—Si linkages and a large number of Si-OH groups. They are then converted into polymers of higher molecular weight containing substantially no Si-OH groups, which are stable in storage. To carry out this "advancing" operation, the solution of the co condensates may be heated after the addition of a catalyst, such as sodium hydroxide, potassium hydroxide, a quaternary ammonium or phosphonium hydroxide, sulphuric acid, phosphoric acid, or an earth activated by a strong acid. The water emanating from the condensation of the Si-OH groups with one another is eliminated as it is formed.

If the diluent of the organosilicon cocondensates has a low boiling point, it is desirable to replace it at this stage of the preparation by another diluent of higher boiling point, so that the reflux temperature is at least 100° C. Under these conditions, the advance of the resin takes place much more rapidly, and the water formed is readily eliminated as a binary water-diluent azeotrope, or is at least entrained by the diluent.

In a preferred embodiment of the invention, a very small quantity of diluent is employed, so that it is possible to heat the mixture at very high temperatures, for example at 200–250° C., without being troubled by the diluent, so that the duration of the heating can be correspondingly reduced. Preferably, a temperature of 250° C., is not exceeded. The water formed is removed as before, immediately it is formed, with the aid of the diluent, and it may be collected in a separator, the diluent being recombined with the cocondensate.

The quantity of catalyst introduced is not critical. Generally, from 1 to 5 parts by weight to 1000 parts of resin to be treated are suitable. When all the water of condensation has been removed, the heating is stopped, the solution is preferably neutralised with a weak, volatile acid or base, depending upon the nature of the catalyst, and then filtered, and the diluent is driven off by distillation in vacuo. If the reaction has been carried out substantially without a diluent, it is advantageous to add a certain quantity of diluent to facilitate the neutralisation and filtration.

The resins of the invention thus prepared are liquids whose viscosity may vary from 3000 to 100,000 cst. at 20° C.

The liquid resins of the invention may be hardened with the aid of an organic peroxide such as dicumyl peroxide, t-butyl perbenzoate or di-t-butyl peroxide. The quantity of peroxide employed generally represents from .5% to 3% of the weight of the resin. Fillers may be introduced to improve the mechanical properties. Glass fibre, glass fabric or glass balls, finely divided silica of combustion and precipitation, diatomaceous silica, calcium carbonate, carbon black, the various natural silicates, asbestos, quartz powder and cork powder are, for example, suitable fillers. Up to 300 parts by weight of filler may be added per 100 parts by weight of resin.

The resins of the invention may be employed mainly in the electrical and electronics field for the production of insulators, for example, to form circuit breaker bodies, insulating cylinders, fuse cartridges, moulded and extruded articles, frames for transformers and terminal plates. Insulating cylinders may be manufactured by coiling glass fibres coated with catalysed resin around a mandrel which rotates at the desired speed. Thereafter, it is sufficient to cross-link the whole by heating. Frames for transformers and terminal plates may be cut out from glass fabric/resin laminates.

The laminates may be prepared by the usual techniques by stacking pieces of glass fabrics previously coated with a layer of the catalysed resin and then pressing them at elevated temperature under low pressure and subsequently heating them in a ventilated oven to complete the hardening. The mechanical properties of these laminates are excellent, and more particularly their flexural strength, measured at 150° C., remains above 10 kg./mm.$^2$. The electrical properties are also good. Thus, the dielectric strength is much higher than 10 kv./mm. even after immersion of the laminates for 24 hours in water at ambient temperature (25° C.). The transverse resistivity is of the order of $10^{15}$ ohm-cm. and remains above $10^{10}$ ohm-cm. after immersion of the laminates for 24 hours in water at ambient temperature. The water absorption of these materials, even after immersion for 24 hours in distilled water at ambient temperature, is less than 0.1% of the weight of the laminate.

The following examples illustrate the invention.

EXAMPLE 1

(A) Into a 6-litre round-bottomed flask provided with a stirrer, a thermometer, a reflux condenser and a dropping funnel are introduced:

Diethyl ether _____ 2.1 l.
$C_6H_5SiCl_3$ _____ 169.2 g. (0.8 mol.).
$(C_6H_5)_2SiCl_2$ _____ 708 g. (2.8 mol.).
$(CH_3)(CH_2=CH)SiCl_2$ _____ 452 g. (3.2 mol.).
$(CH_3)_2SiCl_2$ _____ 82.6 g. (0.64 mol.).
$(CH_3)_3SiCl$ _____ 60.8 g. (0.56 mol.).

2 litres of water are introduced into this stirred mixture in 30 minutes with the aid of the dropping funnel. Stirring is continued for 30 minutes, the aqueous layer is then eliminated, and the remaining ethereal layer is washed with 3×300 cc. of water.

The ether of the ethereal layer is eliminated by distillation, first by heating under atmospheric pressure to a temperature of 100° C. in the mass, and then in vacuo, the distillation being completed under a pressure of 25 mm. Hg at a temperature of 150° C. in the residue.

To the residue are added 50 cc. of toluene and 1.5 g. of ground potassium hydroxide, and the whole is then heated at 200° C. for 2 hours under a nitrogen atmosphere, the water emanating from the condensation of the Si-OH groups with one another being azeotropically distilled and collected in a separator. After cooling the mass to about 100° C., 3 g. of acetic acid are added and the whole is stirred for 1 hour while the temperature is maintained at 100° C. The neutralised resin is diluted by the addition of 500 cc. of toluene. After the addition of animal charcoal, the product is heated under reflux for several minutes and filtered. The toluene of the filtrate is eliminated by distillation under reduced pressure, first at 15 mm. Hg and then at 4 mm. Hg, the heating temperature gradually reaching 200° C. in the mass. 1005 g. of colourless oil containing substantially no Si-OH groups and having a viscosity of 10,800 cst. at 20° C. then remain, in which the atoms and groupings, based upon the quantities of starting materials employed, are in the following ratios and proportions:

$(CH_3+C_6H_5+CH_2=CH)/Si=1.97$
$C_6H_5/Si=0.8$
$CH_2=CH/Si=0.4$
Percent by weight of vinyl groups: 8.1
Percent of $C_6H_5SiO_{1.5}$ units: 10
Percent of $(C_6H_5)_2SiO$ units: 35
Percent of $(CH_3)(CH_2=CH)SiO$ units: 40
Percent of $(CH_3)_2SiO$ units: 8
Percent of $(CH_3)_3SiO_{0.5}$ units: 7.

(B) Eleven squares each measuring 15 × 15 cm. are cut out in the weft and warp directions from a debatched glass fabric of the satin type weighing 308 g./m.$^2$. A quantity of dicumyl peroxide representing 1.5% of its weight is added to the above resin, and a layer of resin thus catalysed is applied to each square. The eleven squares are then disposed one upon the other in strictly identical manner, i.e. with the same weft and warp directions, placed in a press and heated at 150° C. for 2 hours under a pressure of 5 bars. The polymerisation is completed by heating at 200° C. for 4 hours in a ventilated oven.

From the laminate thus obtained, which has a thickness of 3 mm. and contains about 36.5% by weight of silicone resin, parallelepipedic specimens each measuring 25 × 65 × 3 mm. are cut in the warp direction. Measurement of the flexural strength according to the standard ASTM D–790–63 at 20° C. and at 150° C. gives as results 31.5 kg./mm.$^2$ and 11 kg./mm.$^2$ respectively.

The electrical properties of these laminates are as follows:

Dielectric strength: Standard ASTM D. 149, at 20° C., 15 kv./mm.
After immersion for 24 hours in water at 20° C., 11.5 kv./mm.
Transverse resistivity: Standard ASTM D257–58, at 20° C., 1×$10^{15}$ ohm-cm.
After immersion for 24 hours in water at 20° C., 2×$10^{11}$ ohm-cm.

| | At 5×10$^2$ c./s. | At 1×10$^6$ c./s. |
|---|---|---|
| Tangent $\delta$: Standard ASTM D. 257–58, at 20° C. | 9×10$^{-3}$ | 3×10$^{-3}$ |
| After standing in water at 20° C. for 24 hours | 240×10$^{-3}$ | 47×10$^{-3}$ |
| Dielectric constant: Standard ASTM D257–58, at 20° C. | 3.3 | 3.3 |
| After standing in water at 20° C. for 24 hours | 6 | 3.9 |

The water absorption after immersion for 24 hours in water at 20° C. is 0.05%.

EXAMPLE 2

By the procedure of Example 1, starting with the same organochlorosilanes, a second resin is prepared which has the following characteristics:

$(CH_3+C_6H_5+CH_2=CH)/Si=1.97$.
$C_6H_5/Si=0.9$.
$CH_2=CH/Si=0.4$.
Percent of $C_6H_5SiO_{1.5}$ units: 10.
Percent of $(C_6H_5)_2SiO$ units: 40.
Percent of $(CH_3)(CH_2=CH)SiO$ units: 40.
Percent of $(CH_3)_2SiO$ units: 30.
Percent of $(CH_3)_3SiO_{0.5}$ units: 7.
Percent by weight of vinyl groups: 8.1.
    Viscosity at 20° C.: 27,200 cst.

Laminates are made up from this resin as described in Example 1B. The properties of these laminates, determined in accordance with the same standards as in Example 1B, are as follows:
(a) Mechanical properties:
Flexural strength at 20° C., 30.3 kg./mm.$^2$
Flexural strength at 150° C., 11.5 kg./mm.$^2$
(b) Electrical properties:
Dielectric strength at 20° C., 19.5 kv./mm.
Dielectric strength after immerision for 24 hours in water at 20° C., 16 kv./mm.
Transverse resistivity at 20° C., $1 \times 10^{15}$ ohm-cm.
Tranverse resistivity after immersion for 24 hours in water at 20° C., $1.7 \times 10^{10}$ ohm-cm.

|  | At $5\times10^2$ c./s. | At $1\times10^6$ c./s. |
| --- | --- | --- |
| Tangent δ: at 20° C | $4.5\times10^{-3}$ | $2.5\times10^{-3}$ |
| After standing in water at 20° C. for 24 hr. | $300\times10^{-3}$ | $90\times10^{-3}$ |
| Dielectric constant at 20° C | 3.5 | 3.45 |
| After standing in water at 20° C. for 24 hr | 9.5 | 5.15 |

(c) Water absorption after immersion for 24 hours in water at 20° C., 0.07 percent.

We claim:
1. An organosilicon resin consisting of units of the formulae:

$C_6H_5SiO_{1.5}$, $(CH_3)_3SiO_{0.5}$, $(C_6H_5)_2SiO$, $(CH_3)(CH_2{:}CH)SiO$ and $(CH_3)_2SiO$;
containing on average for each silicon atom:
    0.38 to 0.44 vinyl group,
    0.75 to 0.96 phenyl group, and
    1.94 to 1.99 in total methyl, vinyl, and phenyl groups;
and containing on average for each ten $C_6H_5SiO_{1.5}$ units:
    5 to 9 $(CH_3)_3SiO_{0.5}$ units,
    25 to 50 $(C_6H_5)_2SiO$ units,
    30 to 50 $(CH_3)(CH_2{:}CH)SiO$ units, and
    2 to 12 $(CH_3)_2SiO$ units.

2. An organosilicon resin as claimed in claim 1 having a viscosity from 3000 to 100,000 cst. at 20° C.

3. A curable composition comprising an organosilicon resin consisting of units of the formulae:

$C_6H_5SiO_{1.5}$, $(CH_3)_3SiO_{0.5}$, $(C_6H_5)_2SiO$, $(CH_3)(CH_2{:}CH)SiO$ and $(CH_3)_2SiO$;
containing on average, for each silicon atom:
    0.38 to 0.44 vinyl group,
    0.75 to 0.96 phenyl group, and
    1.94 to 1.99 in total methyl, vinyl, and phenyl groups;
and containing on average, for each ten $C_6H_5SiO_{1.5}$ units:
    5 to 9 $(CH_3)_3SiO_{0.5}$ units,
    25 to 50 $(C_6H_5)_2SiO$ units,
    30 to 50 $(CH_3)(CH_2{:}CH)SiO$ units, and
    2 to 12 $(CH_3)_2SiO$ units
and an organic peroxide.

4. A composition as claimed in claim 3 in which the proportion of the peroxide is 0.5 to 3% of the weight of the resin.

5. A composition as claimed in claim 3 reinforced with glass fibre.

6. A cured resin obtained by heating a composition as claimed in claim 3.

References Cited

UNITED STATES PATENTS 3,183,209    5/1965    Hartung et al. _____ 260—46.5

DONALD E. CZAJA, Primary Examiner

M. I. MARQUIS, Assistant Examiner

U.S. Cl. X.R.

159—329; 161—93, 193; 260—46.5